Dec. 27, 1960  H. W. KELLEY ET AL  2,966,135
ANIMAL FEEDER
Filed Dec. 5, 1958  2 Sheets-Sheet 1
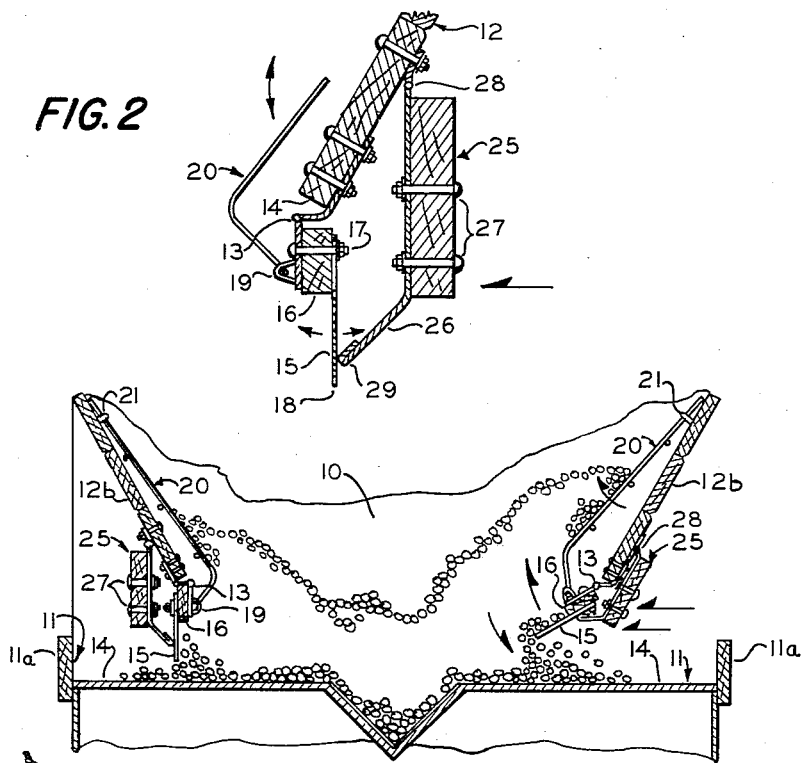
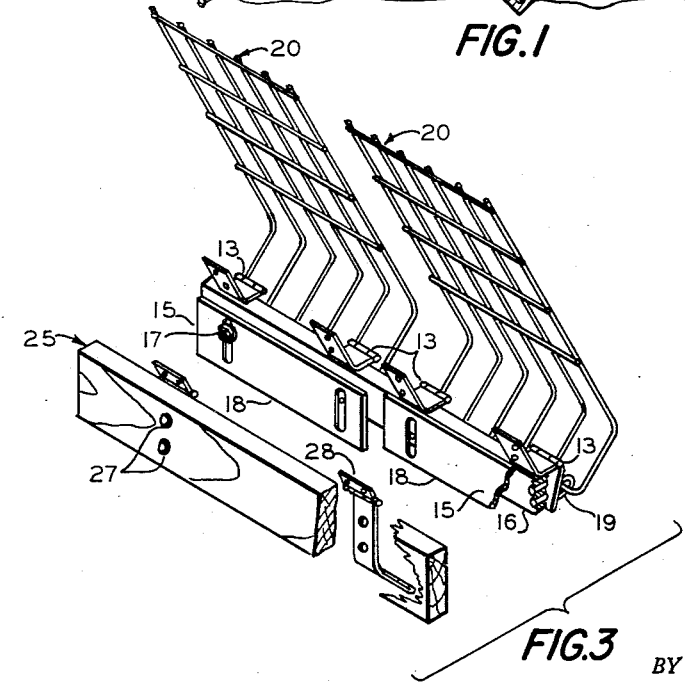
INVENTOR.
HOWARD W. KELLEY
SAM B. MARTING, SR.
BY
CORBETT, MAHONEY,
MILLER & RAMBO.
BY *Wm. V. Miller* ATTY'S.

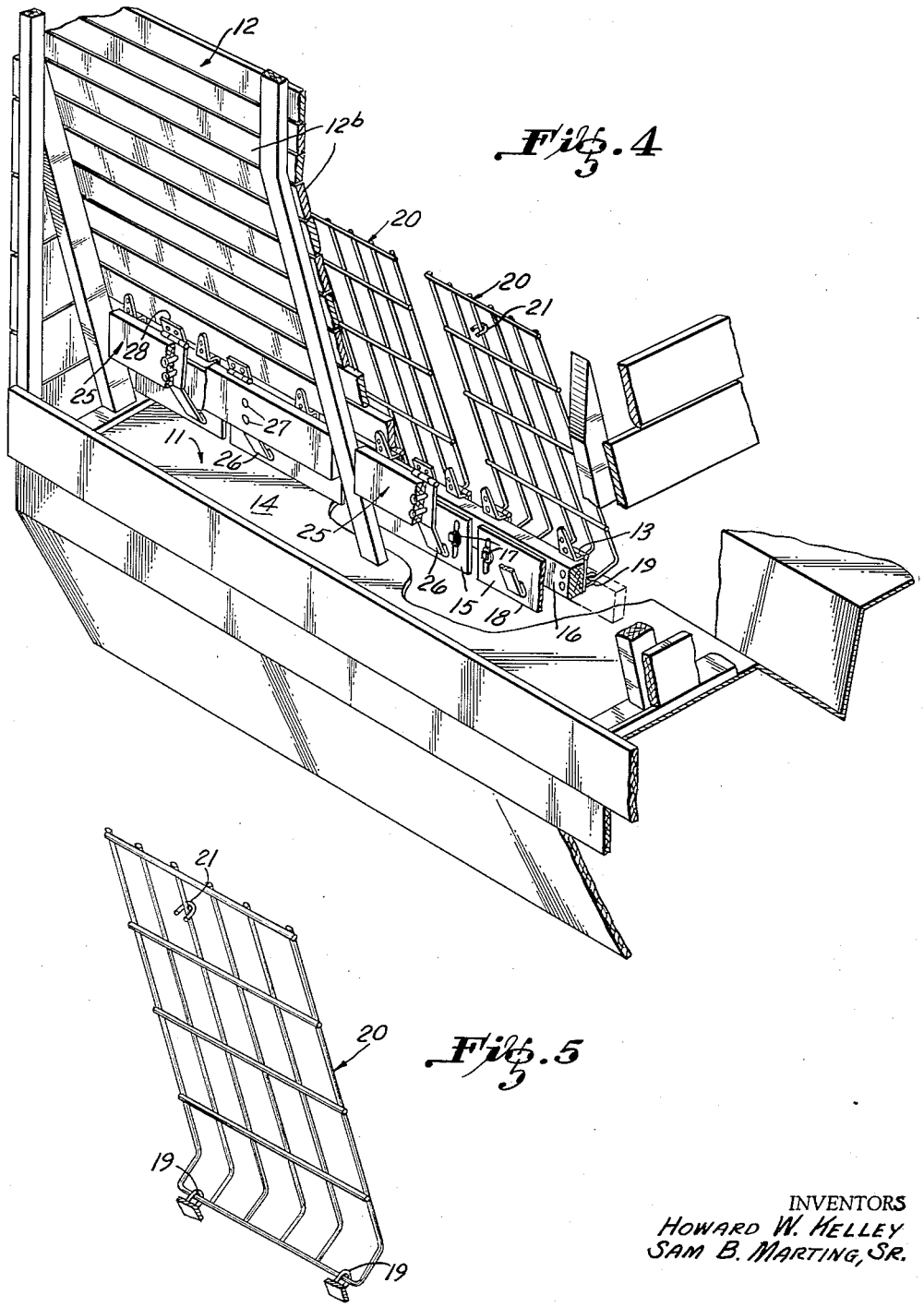

United States Patent Office 2,966,135
Patented Dec. 27, 1960

2,966,135
ANIMAL FEEDER

Howard W. Kelley, Clarksburg, and Sam B. Marting, Sr., Washington C.H., Ohio, assignors to Webber C. French Mfr., Washington Court House, a partnership Filed Dec. 5, 1958, Ser. No. 778,469

2 Claims. (Cl. 119—53.5)

This invention relates to an animal feeder. It has to do, more particularly, with a feeder of the hopper type which is particularly suitable for the feeding of cattle.

Many types of hopper feeders have been provided in the past but they have been designed mainly for the feeding of hogs. They have usually included a heavy hinged overhanging door which is normally closed by gravity and against which the hog must push in order to open the door against the pressure of the weight of the door and that of the feed in the hopper so as to cause the feed to pass downwardly beneath the door into a feed trough associated therewith so the hog may reach it. As is well-known, the hog is an avaricious and cunning animal and will exert sufficient pressure against a heavy hinged door in order to obtain food. However, cattle are more gentle and less cunning than hogs and will be less aggressive in attempting to obtain food. The result is that cattle will not at first push against a heavy hinged door in order to obtain food and it takes considerable periods for them to learn to even attempt to obtain food in this manner. Consequently, the usual hog feeder is not suitable for feeding cattle.

One of the objects of this invention is to provide an animal feeder of the hopper type which is of such a nature that it may be operated with slight pressure to produce the feeding action and is, therefore, particularly suitable for use in feeding cattle.

Another object of this invention is to provide a feeder of the type indicated which is so designed that cattle will learn to use it quickly and effectively.

Another object of this invention is to provide an animal feeder of the hopper type which is free of heavy hinged doors or other heavy objects which are difficult to push and require considerable pressure to operate.

Another object of this invention is to provide a hopper feeder of the type indicated which is so designed and constructed that the feed will flow freely upon activation of the feeder by the cattle without danger of clogging.

Various other objects will be apparent.

In the accompanying drawings I have illustrated a preferred embodiment of this invention but it is to be understood that specific details thereof may be varied without departing from the scope of this invention.

In these drawings:

Figure 1 is a vertical transverse sectional view taken through a hopper feeder constructed according to this invention.

Figure 2 is a detail in vertical section of the actuating mechanism for the feeder.

Figure 3 is an outside view, partly broken away, of the actuating mechanism showing parts disassembled.

Figure 4 is an outside view of the hopper showing the actuating mechanism and with the wall of the hopper broken away to show the fixed agitator rack within the hopper.

Figure 5 is a isometric view of the agitator rack of the feeder.

With reference to the drawings, this invention is shown as comprising a feeder which in its general form may be of any suitable construction to provide the hopper 10 for receiving the feed. The feeder is designed so that the cattle can feed from troughs 11 disposed at each side thereof. At the sides where the troughs 11 are disposed, the feeder is provided with a fixed inwardly angled wall 12 so that the troughs 11 are exposed to the animals to be fed. These inwardly angled walls 12 also provide the tapering converging forward and rearward walls of the hopper. At the lower end of each wall 12, there are provided the actuating units 12b, it being noted that the wall is divided into sections 12b and a unit is associated with each section. The lower end of each wall section 12b terminates at a hinge point 13 which is spaced a substantial distance above the associated bottom section 14 of the hopper. At the hinge joint 13, the wall section 12b has hinged thereto a dependent pressure-receiving bearing plate 15 which extends longitudinally of the wall section 12b. The plate 15 is preferably supported by a heavier agitator-actuating bar 16 which is hinged at the joint 13. Furthermore, the plate 15 is preferably vertically adjustable on the bar 16 by means of vertically disposed slot and bolt units 17. Thus, the lower edge 18 of the plate 15 may be adjusted to the desired level above the associated floor section 14 but is spaced therefrom to provide an outlet throat from the hopper 10 to the associated feed trough 11.

The agitator-actuating bar 16 is attached by means of eyes 19 on its inner surface to the lower end of the agitator rack 20. This rack 20 extends outwardly and upwardly along the inner surface of the associated wall section 12b and is fastened at its upper end by the eyes 21 to the wall. Obviously, the bar 16 and associated plate 15 will hang in dependent position normally but when swung about the hinge joint 13, the agitator rack 20 will be moved in and out to agitate the feed in the hopper 10 to cause it to feed downwardly below the plate 15 and out into the trough 11.

In order to provide simple means by means of which the agitator plate 15 may be swung back and forth with minimum pressure, each unit 12a is provided with a butt board 25 on the wall section 12b directly above the trough 11. This butt board 25 comprises a substantially heavy board which is bolted to a pressure-applying plate 26 by means of the bolts 27. This pressure-applying plate 26 has its upper edge hinged to the outer surface of the wall section 12b at the hinge joint 28. It will be noted that the lower edge of the butt board 25 is intermediate the height of the pressure-receiving plate 15 and that the hinge joint 28 is spaced above and outwardly of the hinge joint 13. The plate 26 has an angularly bent lower edge 29, the extremity of which bears against the face of the associated plate 15. The angularity of the edge 29 is selected to provide for maximum pressure on the plate 15 and usually an angle of 45 degrees is suitable. The extremity of the angled edge 29 is normally adjacent the lower edge of the plate 15 with the plate 15 in dependent position, as shown at the left side of Figure 1. As previously indicated, the plate 15 may be adjusted vertically as desired to properly locate it relative to the lower extremity of the plate 26.

In the use of this feeder, the butt board 25, which is disposed above the outer wall 11a of the feed trough and just slightly rearwardly of such wall, will be engaged by the nose of the animal desiring to obtain food from the associated trough 11. Slight pressure on the butt board 25 will swing the butt board inwardly about the hinge joint 28 and will cause the angular edge of the pressure-applying plate 26 to apply pressure to the lower portion of the pressure-receiving bearing plate 15, as shown at the right side of Figure 1. This substantial leverage applied on the plate 15 will cause it to swing inwardly, thereby agitating the rack 20, by means of the connected bar 16, to cause it to agitate the feed in the hopper 10 which, in turn, will feed downwardly and outwardly through the discharge throat below the lower edge of the plate 15 into the trough 11. As soon as the animal releases pressure on the butt board 25, the butt board and the associated plate 15 will automatically swing back into dependent vertical position. The vertically disposed plate 15 will thereafter prevent excessive flow of feed from the hopper 10 out into the trough 11. During swinging movements of the butt board 25 and the associated bar 15, the extremity of the angled edge 27 of the pressure-applying plate 26 will merely slide vertically on the pressure-receiving bearing plate 15.

Since minimum pressure is required to operate the feeder, this feeder will be particularly suitable for feeding cattle inasmuch as cattle will soon learn that a slight pressure on the butt board 25 will result in a supply of feed into the associated feed trough 11. The feed will flow freely upon agitation by the actuating unit 12a and there will be no danger of clogging in the feed outlet or throat.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An animal feeder comprising a hopper having an inwardly angled wall, said hopper having an outlet throat below the lower edge of said wall, a feed trough disposed outside the outlet throat ahead of the lower edge of said wall, agitating means within the hopper for controlling the flow of feed to and through the outlet throat, an actuating unit for actuating said agitating means and controlling the flow of feed through said throat, said actuating unit comprising a pressure-receiving plate pivotally supported at a pivot point adjacent the lower edge of said wall in normal freely hanging dependent position in said throat, means for connecting said plate to said agitating means, a butt board pivoted to the outer surface of said inwardly angled wall forwardly and upwardly of the point where the pressure-receiving plate is pivoted to the wall and normally being in freely hanging dependent position above and ahead of said pressure-receiving plate, said board and plate normally freely hanging in dependent parallel positions, and a pressure-applying plate carried by said butt board and normally extending rearwardly and downwardly relative thereto at an angle with its lower extremity in contact with the face of said pressure-receiving plate which is normally vertically disposed, said agitating means comprising a rack movably fastened to the interior of said wall and operatively connected to said pressure-receiving plate.

2. An animal feeder comprising a hopper having an inwardly angled wall, said hopper having an outlet throat below the lower edge of said wall, a feed trough disposed outside the outlet throat ahead of the lower edge of said wall, a unit for controlling the flow of feed through said throat, said unit comprising a pressure-receiving plate pivotally supported from the lower edge of said wall in normal freely hanging dependent position in said throat, a butt board pivoted to the outer surface of said inwardly angled wall forwardly and upwardly of the point where the pressure-receiving plate is pivoted to the wall and normally being in freely hanging dependent position above and ahead of said pressure-receiving plate, said board and plate normally freely hanging in dependent parallel positions, and a pressure-applying plate carried by said butt board and extending rearwardly and downwardly relative thereto at an angle with its lower extremity in contact with the face of said pressure-receiving plate which is normally vertically disposed.

References Cited in the file of this patent
UNITED STATES PATENTS

| | | |
|---|---|---|
| 1,701,338 | Rowles | Feb. 5, 1929 |
| 1,719,245 | Smidley | July 2, 1929 |
| 1,788,092 | Fink | Jan. 6, 1931 |
| 2,234,112 | Emrick | Mar. 4, 1941 |